United States Patent
Richardson

(10) Patent No.: US 10,200,752 B2
(45) Date of Patent: Feb. 5, 2019

(54) METHODS AND SYSTEMS FOR LOCATION SPECIFIC OPERATIONS

(71) Applicant: DISH Technologies L.L.C., Englewood, CO (US)

(72) Inventor: Jon Richardson, Chamblee, GA (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/672,997

(22) Filed: Aug. 9, 2017

(65) Prior Publication Data

US 2018/0027290 A1    Jan. 25, 2018

Related U.S. Application Data

(63) Continuation of application No. 14/107,132, filed on Dec. 16, 2013, now Pat. No. 9,769,522.

(51) Int. Cl.
*H04N 21/442* (2011.01)
*H04N 21/41* (2011.01)
(Continued)

(52) U.S. Cl.
CPC ... *H04N 21/44218* (2013.01); *H04N 21/4104* (2013.01); *H04N 21/4126* (2013.01);
(Continued)

(58) Field of Classification Search
CPC ......... H04N 21/44218; H04N 21/4104; H04N 21/4126; H04N 21/439; H04N 21/44; H04N 21/4524

See application file for complete search history.

(56) References Cited

U.S. PATENT DOCUMENTS 3,803,575 A    4/1974    Gotanda
4,127,966 A   12/1978    Schmidt
(Continued)

FOREIGN PATENT DOCUMENTS

CA    2 267 988 A1    4/1998
CH      702136 B1    5/2011
(Continued)

OTHER PUBLICATIONS

U.S. Appl. No. 15/246,079, filed Aug. 24, 2016, Notice of Allowance dated Apr. 10, 2018, all pages.
(Continued)

*Primary Examiner* — Hunter B Lonsberry
*Assistant Examiner* — Alexander Boyd
(74) *Attorney, Agent, or Firm* — Kilpatrick Townsend & Stockton LLP

(57) ABSTRACT

Systems and methods for performing user accommodations are described. An exemplary system may include an electronic device configured to receive audiovisual content and/or user inputs. The electronic device may further include one or more processors as well as memory, which when executed by the one or more processors, cause them to perform one or more locating functions to locate one or more users of the electronic device, and determine a level of interaction for the one or more users based at least in part on the location. The one or more processors may further be caused to perform at least one accommodation function based at least in part on the determined level of interaction for the one or more users or location of the one or more users.

16 Claims, 6 Drawing Sheets

(51) Int. Cl.
    *H04N 21/439*    (2011.01)
    *H04N 21/44*     (2011.01)
    *H04N 21/45*     (2011.01)

(52) U.S. Cl.
    CPC ........... *H04N 21/439* (2013.01); *H04N 21/44*
              (2013.01); *H04N 21/4524* (2013.01)

(56) References Cited

U.S. PATENT DOCUMENTS

| | | | |
|---|---|---|---|
| 4,386,436 A | 5/1983 | Kocher et al. | |
| 4,581,606 A | 4/1986 | Mallory | |
| 4,694,607 A | 9/1987 | Ishida et al. | |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A | 10/1998 | Jeon et al. | |
| 5,886,638 A | 3/1999 | Tanguay | |
| 5,894,331 A | 4/1999 | Yang | |
| 5,926,090 A | 7/1999 | Taylor et al. | |
| 5,970,030 A | 10/1999 | Dimitri et al. | |
| 6,081,758 A | 6/2000 | Parvulescu | |
| 6,104,334 A | 8/2000 | Allport | |
| 6,107,918 A | 8/2000 | Klein et al. | |
| 6,107,935 A | 8/2000 | Comerford et al. | |
| 6,111,517 A | 8/2000 | Atick et al. | |
| 6,119,088 A | 9/2000 | Ciluffo | |
| 6,142,913 A | 11/2000 | Ewert | |
| 6,182,094 B1 | 1/2001 | Humpleman et al. | |
| 6,225,938 B1 | 5/2001 | Hayes et al. | |
| 6,286,764 B1 | 9/2001 | Garvey et al. | |
| 6,330,621 B1 | 12/2001 | Bakke et al. | |
| 6,337,899 B1 | 1/2002 | Alcendor et al. | |
| 6,377,858 B1 | 4/2002 | Koeppe | |
| 6,405,284 B1 | 6/2002 | Bridge | |
| 6,415,257 B1 | 7/2002 | Jungua et al. | |
| 6,445,287 B1 | 9/2002 | Schofield et al. | |
| 6,502,166 B1 | 12/2002 | Cassidy | |
| 6,529,230 B1 | 3/2003 | Chong | |
| 6,543,051 B1 | 4/2003 | Manson et al. | |
| 6,553,375 B1 | 4/2003 | Huang et al. | |
| 6,663,375 B1 | 8/2003 | Huang et al. | |
| 6,646,676 B1 | 11/2003 | DaGraca et al. | |
| 6,662,282 B2 | 12/2003 | Cochran | |
| 6,744,771 B1 | 6/2004 | Barber et al. | |
| 6,748,343 B2 | 6/2004 | Alexander et al. | |
| 6,751,657 B1 | 6/2004 | Zothner | |
| 6,756,998 B1 | 6/2004 | Bilger | |
| 6,792,319 B1 | 9/2004 | Bilger | |
| 6,876,889 B1 | 4/2005 | Lortz et al. | |
| 6,891,838 B1 | 5/2005 | Petite et al. | |
| 6,931,104 B1 | 8/2005 | Foster et al. | |
| 6,976,187 B2 | 12/2005 | Arnott et al. | |
| 6,989,731 B1 | 1/2006 | Kawai et al. | |
| 7,009,528 B2 | 3/2006 | Griep | |
| 7,010,332 B1 | 3/2006 | Irvin et al. | |
| 7,081,830 B2 | 7/2006 | Shimba et al. | |
| 7,082,359 B2 | 7/2006 | Breed | |
| 7,088,238 B2 | 8/2006 | Karaoguz et al. | |
| 7,103,545 B2 | 9/2006 | Furuta | |
| 7,143,298 B2 | 11/2006 | Wells et al. | |
| 7,216,002 B1 | 5/2007 | Anderson | |
| 7,234,074 B2 | 6/2007 | Cohn et al. | |
| 7,260,538 B2 | 8/2007 | Calderone et al. | |
| 7,346,917 B2 | 3/2008 | Gatto et al. | |
| 7,372,370 B2 | 5/2008 | Stults et al. | |
| 7,386,666 B1 | 6/2008 | Beauchamp et al. | |
| 7,391,319 B1 | 6/2008 | Walker | |
| 7,395,369 B2 | 7/2008 | Sepez et al. | |
| 7,395,546 B1 | 7/2008 | Asmussen | |
| 7,529,677 B1 | 5/2009 | Wittenberg | |
| 7,574,494 B1 | 8/2009 | Mayernick et al. | |
| 7,579,945 B1 | 8/2009 | Richter et al. | |
| 7,590,703 B2 | 9/2009 | Cashman et al. | |
| 7,640,351 B2 | 12/2009 | Reckamp et al. | |
| 7,659,814 B2 | 2/2010 | Chen et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,013,730 B2 | 9/2011 | Oh et al. | |
| 8,042,048 B2 | 10/2011 | Wilson et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 4/2012 | Lucas et al. | |
| 8,179,248 B2 | 5/2012 | Eakle, Jr. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,350,694 B1 | 1/2013 | Trundle et al. | |
| 8,355,886 B2 | 1/2013 | Ollivier et al. | |
| 8,413,204 B2 | 4/2013 | White et al. | |
| 8,436,902 B2 | 5/2013 | Kuehnle | |
| 8,498,572 B1 | 7/2013 | Schooley et al. | |
| 8,516,087 B2 | 8/2013 | Wilson et al. | |
| 8,533,144 B1 | 9/2013 | Reeser et al. | |
| 8,539,567 B1 | 9/2013 | Logue et al. | |
| 8,550,368 B2 | 10/2013 | Butler et al. | |
| 8,619,136 B2 | 12/2013 | Howarter et al. | |
| 8,620,841 B1 | 12/2013 | Filson et al. | |
| 8,644,525 B2 | 2/2014 | Bathurst et al. | |
| 8,645,327 B2 | 2/2014 | Falkenburg et al. | |
| 8,667,529 B2 | 3/2014 | Taxier | |
| 8,750,576 B2 | 6/2014 | Huang et al. | |
| 8,780,201 B1 | 7/2014 | Scalisi et al. | |
| 8,781,508 B1 | 7/2014 | Blakely | |
| 8,786,698 B2 | 7/2014 | Chen et al. | |
| 8,799,413 B2 | 8/2014 | Taylor et al. | |
| 8,818,898 B2 | 8/2014 | Schlossberg et al. | |
| 8,898,709 B2 | 11/2014 | Crabtree | |
| 8,923,823 B1 | 12/2014 | Wilde | |
| 8,930,700 B2 | 1/2015 | Wielopolski | |
| 8,948,793 B1 | 2/2015 | Birkhold et al. | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 9,191,804 B1 | 11/2015 | Paczkowski et al. | |
| 9,237,141 B2 | 1/2016 | Logue et al. | |
| 9,246,921 B1 | 1/2016 | Vlaminck et al. | |
| 9,258,593 B1 | 2/2016 | Chen et al. | |
| 9,286,482 B1 | 3/2016 | Dumont et al. | |
| 9,338,054 B2 | 5/2016 | Russell | |
| 9,347,242 B2 | 5/2016 | Cregg et al. | |
| 9,353,500 B1 | 5/2016 | Andreski | |
| 9,443,142 B2 | 9/2016 | Reynolds, Jr. | |
| 9,462,041 B1 | 10/2016 | Hagins et al. | |
| 9,495,860 B2 | 11/2016 | Lett | |
| 9,511,259 B2 | 12/2016 | Mountain | |
| 9,589,448 B1 | 3/2017 | Schneider et al. | |
| 9,599,981 B2 | 3/2017 | Crabtree | |
| 9,621,959 B2 | 4/2017 | Mountain | |
| 9,628,286 B1 | 4/2017 | Nguyen et al. | |
| 9,632,746 B2 | 4/2017 | Keipert et al. | |
| 9,633,186 B2 | 4/2017 | Ingrassia, Jr. et al. | |
| 9,729,989 B2 | 8/2017 | Marten | |
| 9,769,522 B2 | 9/2017 | Richardson | |
| 9,772,612 B2 | 9/2017 | McCarthy et al. | |
| 9,798,309 B2 | 10/2017 | Tirpak | |
| 9,824,578 B2 | 11/2017 | Burton et al. | |
| 9,835,434 B1 | 12/2017 | Sloo et al. | |
| 9,838,736 B2 | 12/2017 | Smith et al. | |
| 9,882,736 B2 | 1/2018 | Lett | |
| 9,888,129 B2 | 2/2018 | Russell | |

(56) References Cited

U.S. PATENT DOCUMENTS

| | | |
|---|---|---|
| 9,900,177 B2 | 2/2018 | Holley |
| 9,912,492 B2 | 3/2018 | McCarthy et al. |
| 9,967,614 B2 | 5/2018 | McCarthy |
| 9,977,587 B2 | 5/2018 | Mountain |
| 9,983,011 B2 | 5/2018 | Mountain |
| 9,989,507 B2 | 6/2018 | Benn |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0154242 A1 | 8/2003 | Hayes et al. |
| 2003/0192600 A1 | 10/2003 | Ford |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0115156 A1 | 6/2006 | Nakajima et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0186740 A1 | 8/2006 | Von Gunten |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0179053 A1 | 7/2008 | Kates |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1 | 3/2010 | Myllymaki |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |

(56) References Cited

U.S. PATENT DOCUMENTS

| | | |
|---|---|---|
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0124859 A1 | 5/2012 | May et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0206269 A1 | 8/2012 | Wickman et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0181855 A1* | 6/2014 | Fife .................. H04N 21/25841 725/25 |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0228062 A1 | 8/2014 | Rubowitz |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1 | 10/2014 | Ricci |
| 2014/0310075 A1 | 10/2014 | Ricci |
| 2014/0313014 A1 | 10/2014 | Huh et al. |
| 2014/0313032 A1 | 10/2014 | Sager et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156031 A1 | 6/2015 | Fadell et al. |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0304689 A1 | 10/2015 | Warren |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0041565 A1 | 2/2016 | Edwards |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |

(56) References Cited

U.S. PATENT DOCUMENTS

| | | | |
|---|---|---|---|
| 2016/0121161 A1 | 5/2016 | Mountain | |
| 2016/0123741 A1 | 5/2016 | Mountain | |
| 2016/0163168 A1 | 6/2016 | Brav et al. | |
| 2016/0182249 A1 | 6/2016 | Lea | |
| 2016/0189527 A1 | 6/2016 | Peterson et al. | |
| 2016/0191912 A1 | 6/2016 | Lea et al. | |
| 2016/0191990 A1 | 6/2016 | McCarthy | |
| 2016/0195602 A1 | 7/2016 | Meadow | |
| 2016/0195856 A1 | 7/2016 | Spero | |
| 2016/0196731 A1 | 7/2016 | Aich et al. | |
| 2016/0203700 A1 | 7/2016 | Bruhn et al. | |
| 2016/0234034 A1 | 8/2016 | Mahar et al. | |
| 2016/0248598 A1 | 8/2016 | Lin et al. | |
| 2016/0256485 A1 | 9/2016 | Wager et al. | |
| 2016/0260135 A1 | 9/2016 | Zomet et al. | |
| 2016/0285644 A1 | 9/2016 | Lu et al. | |
| 2016/0286327 A1 | 9/2016 | Marten | |
| 2016/0323548 A1 | 11/2016 | Khot et al. | |
| 2016/0334811 A1 | 11/2016 | Marten | |
| 2016/0335423 A1 | 11/2016 | Beals | |
| 2016/0338179 A1 | 11/2016 | Aliakseyeu et al. | |
| 2016/0342379 A1 | 11/2016 | Keipert et al. | |
| 2016/0366746 A1 | 12/2016 | van de Ven et al. | |
| 2017/0005822 A1 | 1/2017 | Gao | |
| 2017/0041886 A1 | 2/2017 | Baker et al. | |
| 2017/0048476 A1 | 2/2017 | Freiin von Kapri et al. | |
| 2017/0051925 A1 | 2/2017 | Stefanski et al. | |
| 2017/0054615 A1 | 2/2017 | Wilson | |
| 2017/0061750 A1 | 3/2017 | Eyring et al. | |
| 2017/0065433 A1 | 3/2017 | Singh et al. | |
| 2017/0082987 A1 | 3/2017 | Reddy et al. | |
| 2017/0105190 A1 | 4/2017 | Logan et al. | |
| 2017/0127124 A9 | 5/2017 | Wilson et al. | |
| 2017/0146964 A1 | 5/2017 | Beals | |
| 2017/0168469 A1 | 6/2017 | Marten et al. | |
| 2017/0176961 A1 | 6/2017 | Tirpak | |
| 2017/0187993 A1 | 6/2017 | Martch et al. | |
| 2017/0191693 A1 | 7/2017 | Bruhn et al. | |
| 2017/0191695 A1 | 7/2017 | Bruhn et al. | |
| 2017/0195130 A1 | 7/2017 | Landow et al. | |
| 2018/0038029 A1 | 2/2018 | Beals | |
| 2018/0061158 A1 | 3/2018 | Greene | |

FOREIGN PATENT DOCUMENTS

| | | |
|---|---|---|
| CN | 105814555 A | 7/2016 |
| DE | 3707284 A1 | 9/1988 |
| DE | 4012253 C1 | 4/1991 |
| DE | 10 208 451 A1 | 9/2003 |
| DE | 10 2012 106 719 A1 | 1/2014 |
| EP | 720136 A2 | 7/1996 |
| EP | 743410 A2 | 11/1996 |
| EP | 2 736 027 A1 | 5/2014 |
| EP | 3 080 677 A1 | 10/2016 |
| EP | 3 080 710 A1 | 10/2016 |
| FR | 834856 A | 12/1938 |
| FR | 947943 A | 7/1949 |
| GB | 1445705 A | 8/1976 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2011/149473 A1 | 12/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2017/116533 A1 | 7/2017 |
| WO | 2018/039161 A1 | 3/2018 |

OTHER PUBLICATIONS

U.S. Appl. No. 14/553,763, filed Nov. 25, 2014 Notice of Allowance dated Mar. 27, 2018, all pages.
U.S. Appl. No. 14/982,366, filed Dec. 29, 2015, Non-Final Rejection dated Nov. 1, 2017, all pages.
U.S. Appl. No. 15/246,079, filed Aug. 24, 2016, Non-Final Rejection dated Oct. 19, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/528,402, filed Oct. 30, 2014, Final Rejection dated Oct. 31, 2017, all pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2011/051608 dated May 30, 2011, 13 pages.
International Preliminary Report on Patentability for PCT/EP2011/051608 dated Aug. 16, 2012, 8 pages.
Mexican Institute of Industrial Property Office Action dated Nov. 1, 2013, for Mex. Patent Appln No. MX/a/2012/008882 is not translated into English, 3 pages.
Mexican Institute of Industrial Property Notice of Allowance dated Feb. 10, 2014, for Mex. Patent Appln No. MX/a/2012/008882, 1 page.
International Search Report and Written Opinion for PCT/US2014/053876 dated Nov. 26, 2014, 8 pages.
International Preliminary Report on Patentability for PCT/US2014/053876 dated Jun. 14, 2016, 7 pages.
International Search Report and Written Opinion for PCT/US2014/055441 dated Dec. 4, 2014, 10 pages.
International Preliminary Report on Patentability for PCT/US2014/055441 dated Jun. 14, 2016, 8 pages.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
International Search Report and Written Opinion for PCT/US2016/028126 dated Jun. 3, 2016, all pages.
Lamonica, M., "CES 2010 Preview: Green comes in many colors," retrieved from CNET.com (http://ces.cnet.com/8301-31045_1-10420381-269.html), Dec. 22, 2009, 2 pages.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "AllJoyn Onboarding Service Frameworks," Qualcomm Connected Experiences, Inc., accessed on Jul. 15, 2014, 9 page. Retrieved from https://www.alljoyn.org.
Robbins, Gordon, Deputy Chief, "Addison Fire Department Access Control Installation," 2006 International Fire Code, Section 1008.1.3.4, 4 pages.
"International Building Code Excerpts, Updated with recent code changes that impact electromagnetic locks," Securitron, Assa Abloy, IBC/IFC 2007 Supplement and 2009, "Finally-some relief and clarification", 2 pages.Retrieved from: www.securitron.com/Other/.../New_IBC-IFC_Code_Language.pdf.

(56) References Cited

OTHER PUBLICATIONS

"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
U.S. Appl. No. 14/470,352, filed Aug. 27, 2014 Non Final Office Action dated Nov. 20, 2015, 28 pages.
U.S. Appl. No. 14/470,352, filed Aug. 27, 2014 Final Office Action dated Mar. 17, 2016, all pages.
U.S. Appl. No. 14/470,352, filed Aug. 27, 2014 Non Final Office Action dated Aug. 26, 2016, all pages.
U.S. Appl. No. 14/470,352, filed Aug. 27, 2014 Notice of Allowance dated Dec. 2, 2016, all pages.
International Search Report and Written Opinion for PCT/GB2015/052457 dated Nov. 13, 2015, 11 pages.
International Search Report and Written Opinion for PCT/US2014/055476 dated Dec. 30, 2014, 10 pages.
International Preliminary Report on Patentability for PCT/US2014/055476 dated Jun. 14, 2016, 9 pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 12/700,310, filed Feb. 4, 2010, Office Action dated May 4, 2012, 15 pages.
U.S. Appl. No. 12/700,310, filed Feb. 4, 2010, Final Office Action dated Oct. 10, 2012, 16 pages.
U.S. Appl. No. 12/700,310, filed Feb. 4, 2010 Non-Final Office Action dated Apr. 1, 2013, 16 pages.
U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Non-Final Office Action dated Mar. 11, 2015, 35 pages.
U.S. Appl. No. 12/700,310, filed Feb. 4, 2010 Final Office Action dated Oct. 26, 2015, 19 pages.
U.S. Appl. No. 12/700,310, filed Feb. 4, 2010 Non-Final Office Action dated Jun. 16, 2016, 30 pages.
U.S. Appl. No. 12/700,310, filed Feb. 4, 2010 Notice of Allowance dated Nov. 8, 2016, all pages.
U.S. Appl. No. 14/528,739, filed Oct. 30, 2014 Notice of Allowance dated Jun. 23, 2016, 34 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, Notice of Allowance dated Apr. 30, 2014, 9 pages.
U.S. Appl. No. 13/680,934, filed Nov. 19, 2012, Notice of Allowance dated Jul. 25, 2014, 12 pages.
U.S. Appl. No. 14/107,132, filed Dec. 16, 2013, Non Final Office Action dated May 27, 2015, 26 pages.
U.S. Appl. No. 14/107,132, filed Dec. 16, 2013, Final Rejection dated Dec. 16, 2015, 32 pages.
U.S. Appl. No. 14/107,132, filed Dec. 16, 2013, Non Final Office Action dated Jul. 18, 2016, all pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
U.S. Appl. No. 14/485,188, filed Sep. 12, 2014, Final Rejection dated Feb. 23, 2016, 22 pages.
U.S. Appl. No. 14/485,188, filed Sep. 12, 2014, Non-Final Rejection dated Jun. 17, 2016, 29 pages.
U.S. Appl. No. 14/485,188, filed Sep. 12, 2014, Final Rejection dated Nov. 25, 2016, 22 pages.
U.S. Appl. No. 14/567,348, filed Dec. 11, 2014, Preinterview first office action dated Jan. 20, 2016, 23 pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
U.S. Appl. No. 14/584,075, filed Dec. 29, 2014, Final Rejection dated Oct. 6, 2016, all pages.
U.S. Appl. No. 14/710,331, filed May 12, 2015, Non-Final Rejection dated May 20, 2016, 42 pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
Bdejong_Cree, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Search Report and Written Opinion for PCT/US2016/057729 dated Mar. 28, 2017, all pages.
European Search Report for EP 16 20 0422 dated Jan. 13, 2017, all pages.
International Preliminary Report on Patentability for PCT/GB2015/052457 dated Feb. 28, 2017, all pages.
U.S. Appl. No. 14/107,132, filed Dec. 16, 2013, Notice of Allowance dated Jan. 18, 2017, all pages.
U.S. Appl. No. 14/567,765, filed Dec. 11, 2014, Final Rejection dated Feb. 16, 2017, all pages.
U.S. Appl. No. 14/577,717, filed Dec. 19, 2014, Final Office Action dated Dec. 19, 2016, all pages.
U.S. Appl. No. 14/567,783 filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
U.S. Appl. No. 14/497,130, filed Sep. 25, 2014, Non Final Rejection dated Feb. 8, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.

(56) References Cited

OTHER PUBLICATIONS

U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/565,853, filed Dec. 10, 2014, Non Final Rejection dated Mar. 10, 2017, all pages.
International Preliminary Report on Patentability for PCT/GB2015/052544 dated Mar. 7, 2017, all pages.
Notification of Publication of European Application No. 162004220 as EP 3166308 dated May 10, 2017, 2 pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/671,299, filed Mar. 27, 2015, Notice of Allowance dated Apr. 17, 2017, all pages.
U.S. Appl. No. 14/476,377, filed Sep. 3, 2014, Notice of Allowance dated May 19, 2017, all pages.
U.S. Appl. No. 15/075,412, filed Mar. 21, 2016, Final Rejection dated Apr. 17, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of Brazilian Application No. BR 11 2016 0112032 dated Aug. 8, 2017, 2 pages.
Supplementary European Search Report for EP 14868928 dated Jul. 7, 2017, 11 pages.
Notification of Publication of European Application No. 15763643.2 as EP 3189511 dated Jul. 12, 2017, 1 page.
Notification of Publication of Brazilian Application No. BR 11 2016 010376 9 dated Aug. 8, 2017, 1 page.
Supplementary European Search Report for EP 14870507 dated Jun. 28, 2017, all pages.
"Plug-In Carbon Monoxide & Natural Gas Alarm with Backup Battery Protection," Universal Security Instruments, Inc., 2011, 12 pages.

U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014 Preinterview first office action dated Oct. 6, 2017, all pages.
Mark Edward Soper, "Absolute Beginner's Guide to Home Automation," 2005, Que Publishing, p. 57, 121.
U.S. Appl. No. 14/981,501, filed Dec. 28, 2015, Final Office Action dated Oct. 10, 2017, all pages.
International Preliminary Report on Patentability for PCT/US2016/028126 dated Nov. 14, 2017, all pages.
International Search Report and Written Opinion for PCT/US2017/047900 dated Nov. 24, 2017.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.
U.S. Appl. No. 14/986,483, filed Dec. 31, 2015, Non-Final Rejection dated Dec. 1, 2017, all pages.
U.S. Appl. No. 14/584,075, filed Dec. 29, 2014, Notice of Allowance dated Dec. 26, 2017, all pages.
U.S. Appl. No. 14/710,331, filed May 12, 2015, Notice of Allowance dated Dec. 7, 2017, all pages.
U.S. Appl. No. 14/832,821, filed Aug. 21, 2015, Notice of Allowance dated Dec. 18, 2017, all pages.
Office Action CN Appln No. 201480067003.5 dated Jan. 19, 2018, all pages.
U.S. Appl. No. 14/952,580, filed Nov. 25, 2015, Notice of Allowance dated Feb. 12, 2018, all pages.
U.S. Appl. No. 14/528,402, filed Oct. 30, 2014, Notice of Allowance dated Jan. 29, 2018, all pages.
U.S. Appl. No. 14/970,235 Non Final Rejection dated Jan. 31, 2018, all pages.
U.S. Appl. No. 14/986,483, filed Dec. 31, 2015, Notice of Allowance dated May 3, 2018, all pages.
U.S. Appl. No. 14/986,496, filed Dec. 31, 2015, Notice of Allowance dated May 18, 2018, all pages.
U.S. Appl. No. 15/246,259, filed Aug. 24, 2016 Non-Final Rejection dated May 30, 2018, all pages.
U.S. Appl. No. 15/230,155, filed Aug. 2016, Non-Final Office Action dated May 16, 2018, all pages.

* cited by examiner

METHODS AND SYSTEMS FOR LOCATION SPECIFIC OPERATIONS

CROSS-REFERENCE TO RELATED APPLICATIONS

The present application is a continuation of U.S. patent application Ser. No. 14/107,132, filed Dec. 16, 2013, entitled "METHODS AND SYSTEMS FOR LOCATION SPECIFIC OPERATIONS," the contents of which are incorporated herein by reference, in their entirety.

TECHNICAL FIELD

The present technology relates to systems and methods for accommodating a user of an electronic device. More specifically, the present technology relates to accommodating a user of an electronic device based on the user's relative location and/or level of interaction.

BACKGROUND

As technology, such as audiovisual technology, continues to improve, a variety of modifications can be performed based on user preferences. For example, if a viewer is watching a movie, the viewer may have a preference regarding whether a movie is displayed in a widescreen format or has been adjusted to maximize screen space for a display. However, with many potentially available users of the devices in a single household, different preferences may be had by each viewer, and each viewer may have to adjust these preferences whenever he or she decides to utilize the technology. This may result in frustration for viewers wishing for simpler ways by which their preferences may be used.

Thus, there is a need for improved methods and systems for identifying users of audiovisual technology and performing operations that may accommodate each specific user. These and other needs are addressed by the present technology.

SUMMARY

Systems and methods for performing user accommodations are described. An exemplary system may include an electronic device configured to receive audiovisual content and/or user inputs. The electronic device may further include one or more processors as well as memory, which when executed by the one or more processors, cause them to perform one or more locating functions to locate one or more users of the electronic device, and determine a level of interaction for the one or more users based at least in part on the location. The one or more processors may further be caused to perform at least one accommodation function based at least in part on the determined level of interaction for the one or more users or location of the one or more users.

The one or more processors may cause the electronic device to perform a scan to locate the one or more users. In disclosed embodiments at least one of the one or more users may be located based on the location of a controlling device. Controlling devices may include a variety of devices including remote controls, mobile devices, video game controllers, and computing devices. The controlling device or devices may be communicatively coupled with the electronic device, and may include a wired or wireless connection. Exemplary controlling devices may be configured to send signal information to the electronic device on a predetermined basis, and the signal information may include location information. In disclosed embodiments the accommodation function may include an adjustment of at least one audiovisual component. For example, the accommodation function may include automatically adjusting an audio component, and the accommodation function may include automatically adjusting a video component.

In exemplary devices, the one or more processors may be further caused to identify at least one user as a controlling user subsequent to locating that user. The accommodation function may include an automatic adjustment of the display property for the audiovisual content based on a predetermined preference of the identified controlling user. In disclosed embodiments the electronic device may determine that the user has a high level of interaction, and the accommodation may include making available at least one interactive component of a broadcast being transmitted from the electronic device to the display device. The electronic device may also determine that the user has a low level of interaction, and the accommodation may include automatically transmitting an interactive message to the display device or a controlling device requesting a response from at least one user. The interactive message may include a request to transfer a broadcast from the display device communicatively coupled with the electronic device to an alternative display device. The interactive message may also include a request for response based on inactivity determined by the electronic device.

Methods of accommodating a user of an electronic device are also described and may include locating one or more users with the electronic device. The methods may include determining with the electronic device a level of interaction for the one or more users based at least in part on the location of the one or more users. The methods may also include performing at least one accommodation with the electronic device based at least in part on the determined level of interaction for the one or more users or the location of the one or more users. The methods may further include identifying at least one user as a controlling user after locating that particular user. The identifying operation of the methods may include determining an identity of the controlling user and presenting the message to the user requesting confirmation of the identity of the controlling user.

Such technology may provide numerous benefits over conventional techniques. For example, as soon as a user is positioned in a favorite location or using a specific controlling device, the electronic device may automatically determine who that user is and adjust preferences accordingly. Additionally, by monitoring the location of the user or controlling device, the electronic device may adjust audiovisual parameters based on where a user may be or to where a user may have moved. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology is directed to performing accommodations for one or more users of an electronic device based on the user location and/or level of interaction. The technology can allow users to have their preferences enacted automatically, as well as to have the experience based on utilizing the device improved or facilitated. In so doing, users may experience improved sound and viewing, along with reducing frustrations associated with having to manually adjust preferences or components while participating. These and other benefits will be explained in detail below.

Although embodiments detailed herein are directed toward controlling television based equipment, the principles easily can be extended to other types of content and devices, such as DVD equipment, digital video recorder (DVR) equipment, video game equipment, computer equipment, handheld electronic devices, and the like. In addition, the terms "television" or "television service" can include traditional television programming, such as linear television programs, as well as other types of audio, video and/or audiovideo content, such as on-demand video content, on-demand or streaming audio content, streaming video content and the like delivered via any type of content delivery systems, such as cable, satellite, cellular/wireless, Internet/IP, and/or any other content delivery technology or system currently known or hereafter developed. Furthermore, embodiments herein describe set-top boxes or receivers and/or other devices being connected with a television or other device having an electronic display. However, the electronic device can also be incorporated into or be a part of the device having the display or display device, such as a television with an integrated cable, satellite or IPTV receiver. Alternatively, the electronic device may be a DVR or DVD player including the present technology. The technology discussed herein additionally can be extended to any of a variety of other electronic devices, display devices, or combined devices, such as, for example, computers, tablets, hand-held mobile devices, cell phones, e-readers, personal media players, and the like. A person of ordinary skill in the art will recognize various alterations, additions, omissions, and substitutions.

Figure 1:
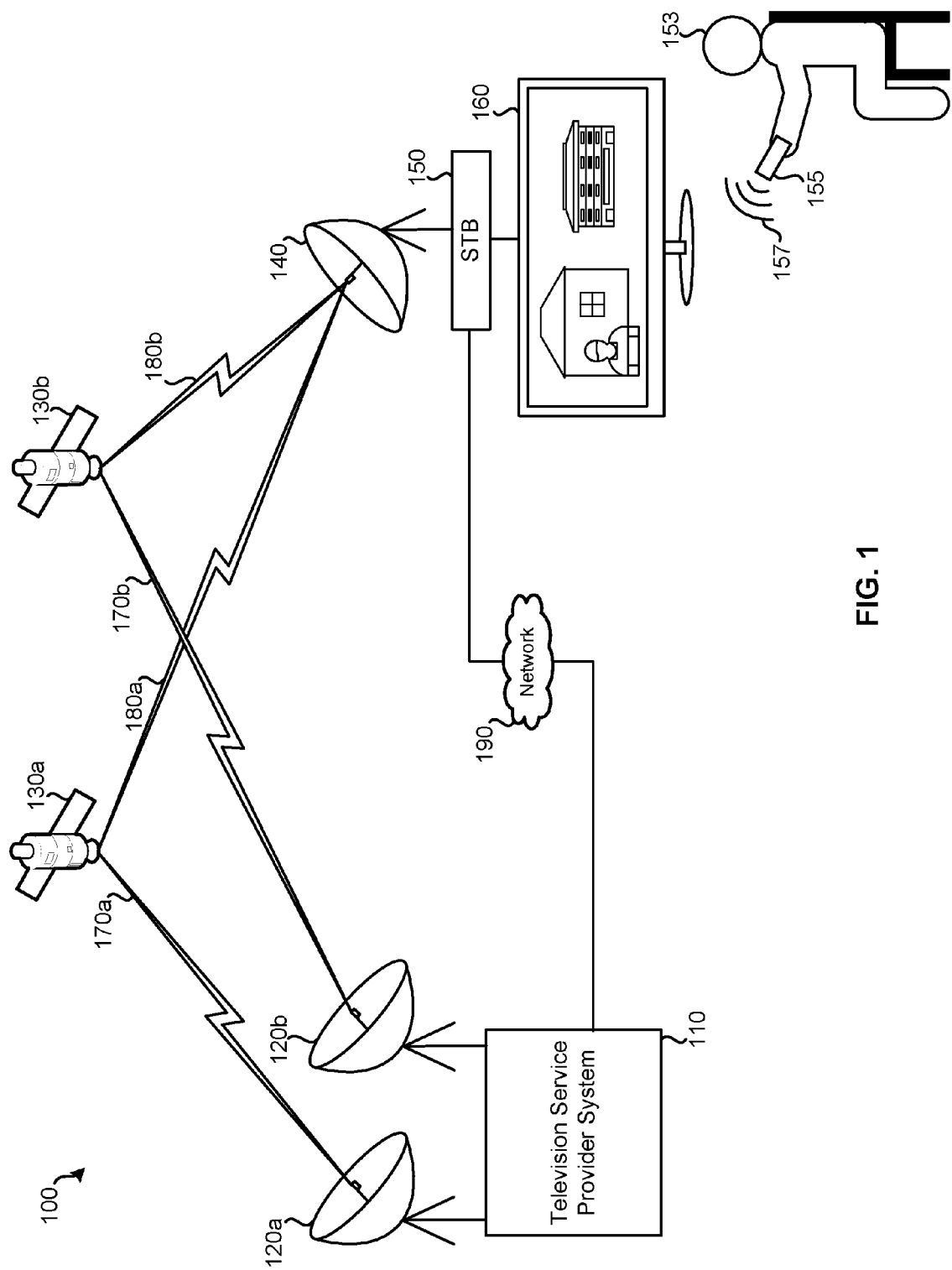
FIG. 1 shows a simplified media service system that may be used in accordance with embodiments of the present technology.

FIG. 1 is a simplified illustration of an embodiment of a satellite television distribution system 100. Satellite television distribution system 100 may include: television service provider system 110, satellite transmitter equipment 120, satellites 130, satellite dish 140, set-top box (STB) 150, and television 160. The television 160 can be controlled by a user 153 using a remote control device 155 that can send wireless signals 157 to communicate with the STB 150 and/or television 160. Although discussed as being wireless for user convenience, the technology may additionally include a wired coupling between the remote control device 155 and STB 130 or television 160. Alternate embodiments of the satellite television distribution system 100 may include fewer or greater numbers of components. While only one satellite dish 140, STB 150 and television 160, collectively referred to as user equipment, are illustrated, it should be understood that multiple (tens, thousands, millions, etc.) instances of user equipment may be connected within the data communication network 190.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels or audio channels from various sources. Such television channels may include multiple television channels that contain the same content, but may be in different formats, such as high-definition and standard-definition. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120, and/or other satellite transmitter equipment, to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130a. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
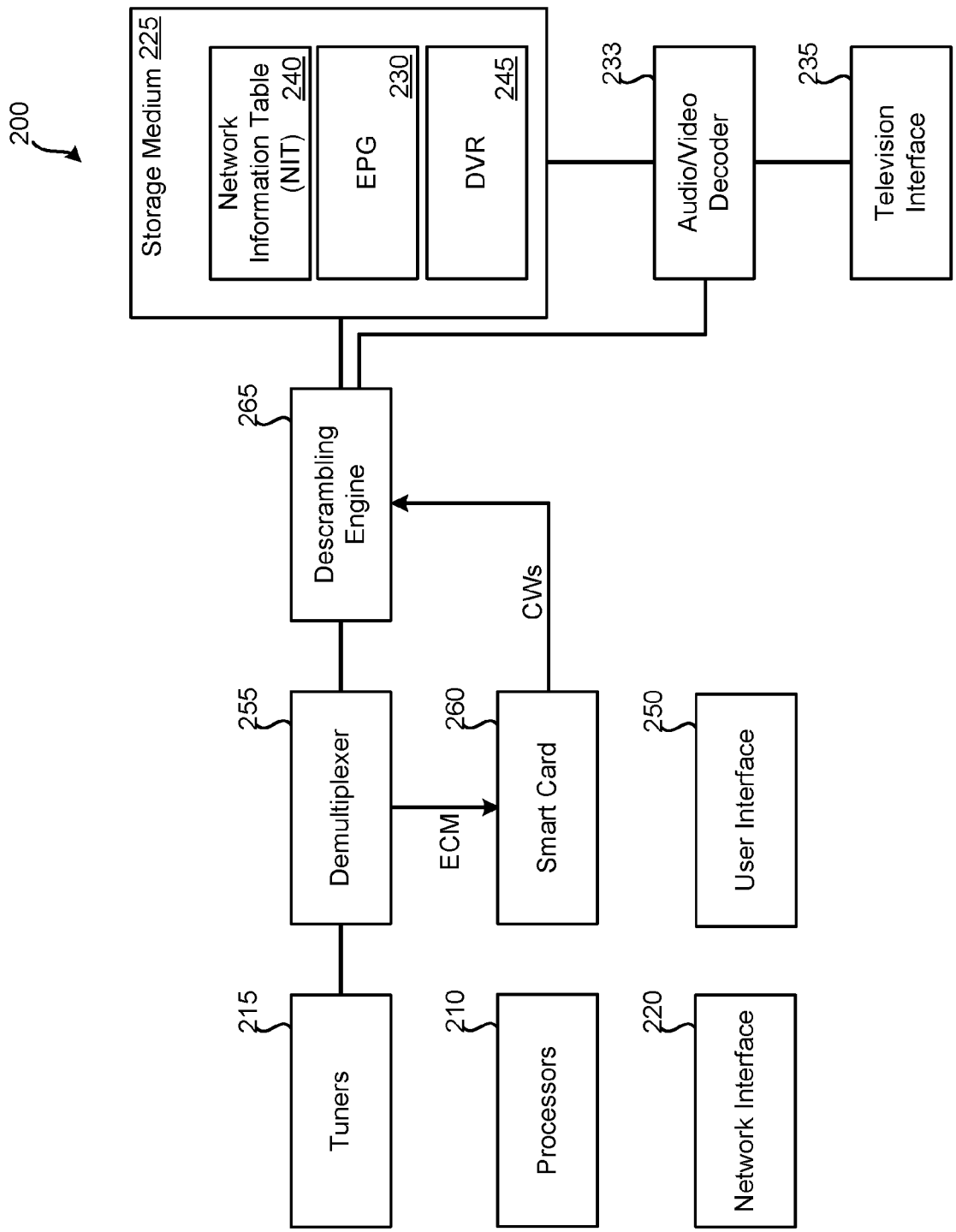
FIG. 2 illustrates an exemplary electronic device that may be used in accordance with embodiments of the present technology.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional details of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170*a* represents a signal between satellite uplink 120*a* and satellite 130*a*. Uplink signal 170*b* represents a signal between satellite uplink 120*b* and satellite 130*b*. Each of uplink signals 170 may contain streams of one or more different television channels. For example, uplink signal 170*a* may contain a certain group of television channels, while uplink signal 170*b* contains a different grouping of television channels. Each of these television channels may be scrambled such that unauthorized persons are prevented from accessing the television channels.

Transponder stream 180*a* represents a signal between satellite 130*a* and satellite dish 140. Transponder stream 180*b* represents a signal path between satellite 130*b* and satellite dish 140. Each of transponder streams 180 may contain one or more different television channels in the form of transponder streams, which may be at least partially scrambled. For example, transponder stream 180*a* may include a first transponder stream containing a first group of television channels, while transponder stream 180*b* may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region, e.g., to distribute local television channels to the relevant market. Different television channels may be transmitted using the same frequency of the transponder stream to a different geographic region.

FIG. 1 illustrates transponder stream 180*a* and transponder stream 180*b* being received by satellite dish 140. For a first group of television channels, satellite dish 140 may receive a transponder stream of transponder stream 180*a*; for a second group of channels, a transponder stream of transponder stream 180*b* may be received. STB 150 may decode the received transponder stream. As such, depending on which television channel(s) are desired, a transponder stream from a different satellite, or a different transponder of the same satellite, may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood, however, that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. It is also to be understood that the technology disclosed herein can be practiced on and by cable, satellite, internet-based, over-the-air, or any other system that distributes video for display.

FIG. 2 illustrates a block diagram of an embodiment of a set-top box 200, or alternatively a television receiver 200. STB 200 may be set-top box 150 of FIG. 1, or may be incorporated as part of a television, such as television 160 of FIG. 1. STB 200 may include: processors 210, tuners 215, network interface 220, non-transitory computer-readable storage medium 225, electronic programming guide (EPG) 230, television interface 235, networking information table (NIT) 240, digital video recorder (DVR) 245, user interface 250, demultiplexer 255, smart card 260, and/or descrambling engine 265. In other embodiments of STB 200, fewer or greater numbers of components may be present. It should be understood that the various components of STB 200 may be implemented using hardware, firmware, software, and/or some combination thereof. For example, EPG 230 may be executed by processors 210.

Processors 210 may include one or more general-purpose processors configured to perform processes such as tuning to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by processor 210.

Tuners 215 may include one or more tuners used to tune to television channels, such as television channels transmitted via satellite or cable. Network interface 220 may be used to communicate via an alternate communication channel with a television service provider. Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, NIT 240, and/or DVR 245. Recorded television programs may be stored using storage medium 225.

EPG 230 may store information related to television channels and the timing of programs appearing on such television channels. EPG 230 may be stored using non-transitory storage medium 225, which may be a hard drive. Audio/video decoder 233 may serve to convert encoded video and audio into a format suitable for output to a display device. Television interface 235 may serve to output a signal to a television, or another form of display device, in a proper format for display of video and playback of audio. The network information table (NIT) 240 may store information used by set-top box 200 to access various television channels. Digital Video Recorder (DVR) 245 may permit a television channel to be recorded for a period of time. DVR 245 may store timers that are used by processors 210 to determine when a television channel should be tuned to and recorded to DVR 245 of storage medium 225. In some embodiments, a limited amount of storage medium 225 may be devoted to DVR 245. Timers may be set by the television service provider and/or one or more users of the STB. DVR 245 may be configured by a user to record particular television programs. Whether a user directly tunes to a television channel or DVR 245 tunes to a first television channel, NIT 240 may be used to determine the satellite, transponder, ECM PID (packet identifier), audio PID, and video PID.

User interface 250 may include a remote control, physically separate from STB 200, and/or one or more buttons on STB 200 that allows a user to interact with STB 200. User interface 250 may be used to select a television channel for viewing, view EPG 230, and/or program DVR 245. Demultiplexer 255 may be configured to filter data packets based on PIDs. For example, if a transponder data stream includes multiple television channels, data packets corresponding to a television channel that is not desired to be stored or displayed by the user, may be ignored by demultiplexer 255. Descrambling engine 265 may use the control words output by smart card 260 in order to descramble video and/or audio corresponding to television channels for storage and/or presentation.

For simplicity, STB 200 of FIG. 2 has been reduced to a block diagram, and commonly known parts, such as a power supply, have been omitted. Further, some routing between the various modules of STB 200 has been illustrated. Such illustrations are for exemplary purposes only. Two modules not being directly or indirectly connected does not indicate the modules cannot communicate. Rather, connections between modules of the STB 200 are intended only to indicate possible common data routing. It should be understood that the modules of STB 200 may be combined into a fewer number of modules or divided into a greater number of modules. Further, the components of STB 200 may be part of another device, such as built into a television. Also, while STB 200 may be used to receive, store, and present television channels received via a satellite, it should be understood that similar components may be used to receive, store, and present television channels via a cable network. Although STB 200 is identified as a suitable device with which to practice the disclosed technology, it is to be understood that any number of devices may be utilized that are capable of transmitting, displaying, and processing video content, including televisions, DVRs, DVD players, handheld devices, tablets, computers, etc.

Figure 3:
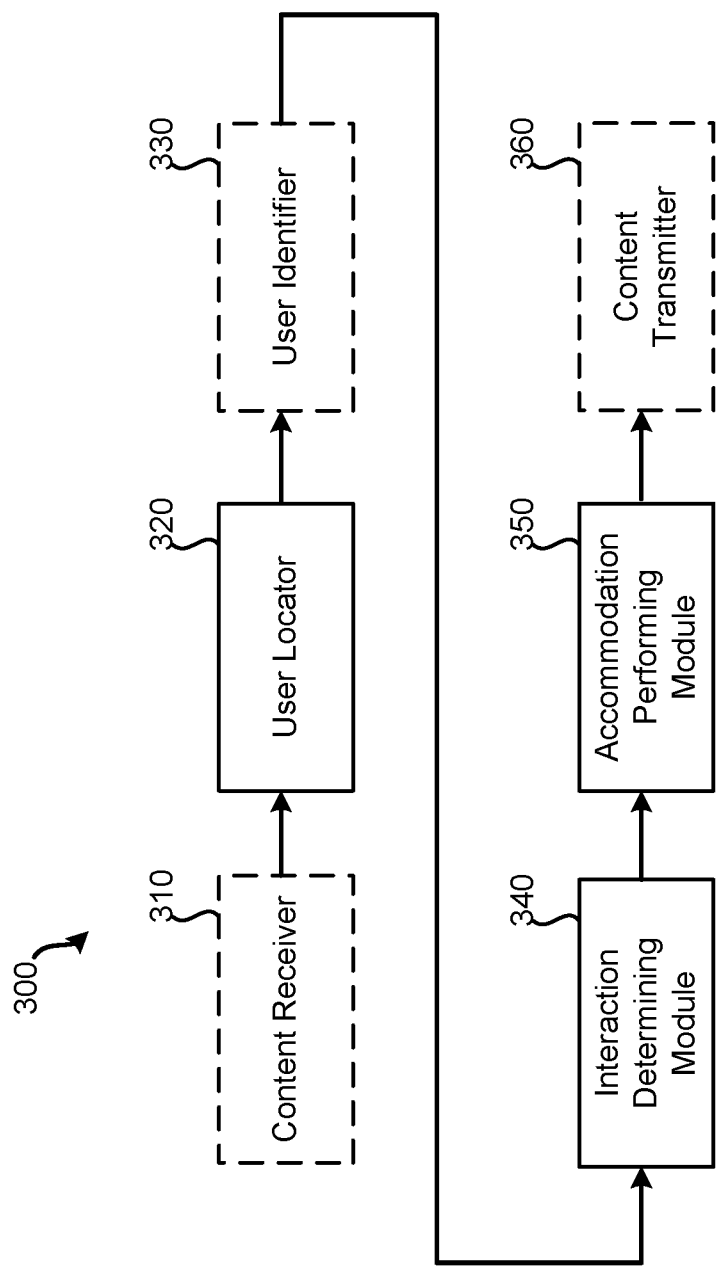
FIG. 3 illustrates modular components that may be used in accordance with embodiments of the present technology.

FIG. 3 is an illustration of an embodiment of modular components of an application 300 that may include hardware, software, firmware or any such combination, which may be used to perform the present technological functions. In disclosed embodiments, application 300 may include more or less modules, and the modules may additionally be separated into multiple modules, or the modules may be combined. The modules may additionally be aspects of more than one application run by one or more processors, such as processors 210 of device 200, or processors 610 described below. The application may be stored in memory such as memory 635 as described in detail below. In this embodiment, the modules may be run concurrently, in differing order, or without one or more of the specified modules in order to perform the technological functions described herein. The modules of application 300 will be discussed in reference to STB 200 as previously described, but it is to be understood that the application 300 may be incorporated with a variety of other electronic devices including a DVR, DVD player, television, computer, tablet, or hand-held device.

An electronic device, such as STB 200 as previously discussed with respect to FIG. 2, may include at least one input component configured to receive audiovisual content, such as from television service provider 110, or from an incorporated or otherwise connected video content player such as a DVR or DVD player. Additionally, STB 200 may be configured to receive audio and/or video data from additional sources accessed via network 190. STB 200 may also include at least one user input component configured to receive one or more user instructions, such as from remote control 155. STB 200 may include at least one output component communicatively coupled with a display device, such as television 160. The electronic device may be directly coupled with the display device or otherwise in communication with the device such that video data may be transmitted wirelessly, for example. The STB 200 may also be configured with multiple output components, which may be configured to provide video data to multiple display devices. The STB 200 may send a main video as received from the service provider to the main display device, such as television 160, and also send an additional video data stream to an additional display device, such as a laptop, smartphone, or other device capable of receiving a video display (not shown).

The electronic device may include one or more processors, as well as memory, that coordinate to perform the application 300. In operation, optionally included content receiver 310 may receive audio and/or video content as received into the electronic device, or another electronic device. The content receiver 310 may be optional, for example, or unnecessary in the case of a DVD player, which may generate or retrieve the content from an inserted disc. User locator 320 may perform one or more locating functions in order to locate one or more users of the electronic device. The electronic device may locate users in one or more ways including the relative location of the user or a controlling device, or based on an input provided by one or more users. For example, the electronic device may perform a scan of an area or space about the electronic device in order to determine the location of users. The scan may be performed when the electronic device is powered on, and may occur automatically at intermittent intervals such as milliseconds, seconds, minutes, hours, etc., in order to update user location periodically.

The scan may include IR technology, or any other technology suitable to scan an area for motion, heat, or any other characteristics that might be used to identify the position of one or more users. In one exemplary scan technique, not to be used to limit the technology, the electronic device may utilize a depth map with a projected image, such as structured light, as well as other vision techniques including depth from focus or depth from stereo to determine object locations. The electronic device may then map human features onto the depth map, such as arms, etc., to infer body position of potential users. Any movement of users may similarly be used to identify users or body movement at any time during the use of the device. Additional input such as sound tracking, including voices, may be used to determine location as well. For example, user voices for alternative users may be saved in profiles, and during a scanning operation, voices may be used to further identify location or identity of users. In embodiments, the electronic device may present a request for a voice instruction in order to provide information useful for such identification.

In disclosed embodiments, at least one of the one or more users may additionally or alternatively be located based on the location of a controlling device. The controlling device may be any number of components, and may include a remote control associated with the electronic device, a videogame controller, a mobile device, or a computing device. Such a controlling device may be communicatively coupled with the electronic device, which may include a wired or wireless connection in various embodiments. The controlling device may intermittently or continuously update the electronic device on the location of the controlling device, which may be used as an indicator for the location of a user. For example, a user may be holding a remote control or have it placed proximate the user, which can be used to instruct the electronic device of the relative position of the user. As another example, the controlling device may be a tablet, or a mobile device such as, for example, a smart phone. The user may be holding such a controlling device, or may have it adjacent the user, or it may be placed in the user's clothes such as in a pocket. The device may be configured to send signal information to the electronic device on a predetermined basis, and the signal information may include location information. As such, as the user adjusts position or moves to another location the electronic device may be updated with the new location of the user. The signal information may be transmitted at intermittent time intervals, as well as upon any movement of the controlling device.

Additionally, the electronic device may be preprogrammed with ownership information for each controlling device. Optional user identifier 330 may have access to or may store the identities of family members based on their personal devices. For example, in many households each member of the family has his or her own cell phone or tablet. These devices may be used as controlling devices for the electronic device, and user identifier 330 may inform the electronic device of the identity of particular users located by the electronic device. Once a specific user who has been located has further been identified, this user may be determined to be a controlling user by the electronic device. When multiple controlling devices are located and identified at any particular time, the electronic device may determine a controlling user as any of the users who may provide input to the electronic device, or based on a predetermined hierarchy of controllers.

Once the electronic device has located and/or identified one or more users, interaction determining module 340 may be used to determine a level of interaction for the one or more users. Such a determination may be based at least in part on the location of one or more of the users, and can be used in one or more accommodation functions performed by the electronic device. The determination for level of interaction may be based on any predetermined scale such as on a numeric range, e.g. 1-100 with one being a very low level of engagement and 100 being a very high level of engagement, or more simply based on a high, medium, or low level of interaction. If a user is in close proximity to the electronic device, such as sitting on a couch watching television, the device may determine a high level of interaction. However, if the user is determined to be further from the electronic device, such as in an adjacent room, e.g. an adjacent kitchen or nearby bathroom, the electronic device may determine a low level of interaction. Level of interaction may also be determined based on inputs received from a controlling device as well. For example, if a user has consistently utilized fast-forward or other technology to skip commercials during a broadcast, these received instructions may be utilized to determine a level of interaction as well.

Once the application 300 has determined one or more user locations or levels of interaction, the electronic device may perform at least one accommodation function via the accommodation performing module 350. The accommodation function may be based at least in part on either or both of the determined level of interaction for the user or the location of the user. The accommodation may include adjustment to a broadcast being displayed, or an adjustment of at least one audiovisual component associated with the electronic device. For example, the accommodation may include automatically adjusting an audio component such as a speaker system or configuration. When a user has been determined to be in a specific location in relation to the electronic device or the system as a whole, the accommodation may include balancing sound, such as a surround sound system, in order to direct the sound more appropriately towards the viewer. The accommodation may also include automatically adjusting a video component or the display itself. For example, a user may prefer widescreen format, or an original version, of content being displayed on a display device coupled with the electronic device. Another user may prefer the format to be adjusted as needed to better occupy display space available. These preferences may be stored on or otherwise be accessible by the electronic device, and then when each particular user is interacting with the electronic device the accommodation may include automatically adjusting the display to the preferred format of that user. These and other accommodations will be discussed in further detail with respect to the methods described below.

Optional content transmitter 360 may be used to transmit audio and/or visual material to one or more display devices, and may further be used to transmit additional material in conjunction with accommodations being performed as will be described in further detail below. The electronic device may include user inputs as previously identified for receiving user instructions or otherwise allowing the user to interact with application 300. For example, a user may instruct the device to transmit for display a menu with which the user may interact, or the user may respond to displays or interactive messages presented by the electronic device. Additional aspects of such messages are described further below.

Figure 4:
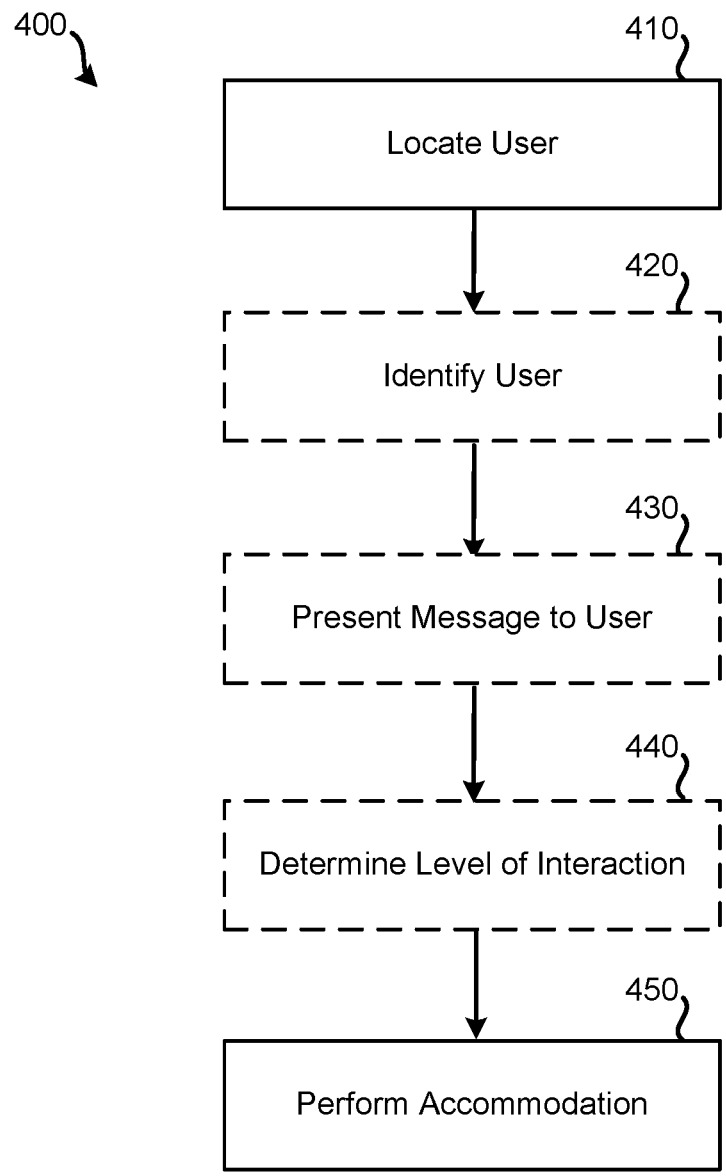
FIG. 4 shows a simplified flow diagram of a method for performing a user accommodation according to embodiments of the present technology.

The systems and devices previously described may be used in performing various methods. FIG. 4 illustrates an embodiment of a method 400 for accommodating a user of an electronic device. Method 400 may be performed using any of the systems or components previously described. Method 400 may allow for an electronic device to locate one or more users and to adjust one or more settings of various components based on user location and/or preferences of particular users. Each step of method 400 may be performed at or by a single electronic device, such as an STB, DVR, or mobile device, for example, or by multiple devices communicating with one another. Means for performing each step of method 400 include an electronic device and/or the various components of an electronic device or distribution system, such as those detailed in relation to FIGS. 1-3. Method 400 may be performed using a computerized device, such as a device incorporating some or all of the components of computer system 600 of FIG. 6.

At step 410, an electronic device locates one or more users. The electronic device may perform a scan of surrounding areas in order to determine user location, or the electronic device may receive location information from a user or a controlling device being operated by a user. At optional step 420, the electronic device may identify at least one user as a controlling user subsequent to locating the user. The identity of the controlling user may be based on specific personal data, such as ownership of the controlling device, or may more generally be based on a location of the user. For example, the electronic device may be preprogrammed with favorite locations for particular users, such as if each member of a family has a particular position from which they interact with the electronic device. Accordingly, based on a user being located in a particular position and identified either by the electronic device or controlling device, the electronic device may compare this location with such favorite locations and determine the identity of the user. At optional step 430, the electronic device may present a message to the located user either via a coupled display device or via a controlling device requesting confirmation of the identity of the user. For example, if the user is located in a position normally associated with or preprogrammed to be the location for a mother within a family, the message presented may include a query similar to, "Are you mom?" The message may further include response options including yes/no or also the ability to select the user based on preprogrammed identities. Additionally, selecting no may present a subsequent message with each of a set of preprogrammed identities for selection by the user.

Once the location and/or identity of one or more of the users has been determined, the electronic device may determine a level of interaction for one or more of the users based at least in part on the location of the one or more users. Determining the level of interaction for one or more users may occur in numerous ways, and may be used to perform accommodations or enact preferences for a user. In disclosed embodiments, if the user is determined to be relatively near the electronic device, such as a favorite position on a couch or chair, or within a pre-designated distance of the electronic device such as up to 2, 3, 5, 7, 10, 13, 15, etc., feet from the electronic device, the user may be determined to have a high level of interaction or engagement with the electronic device. In disclosed embodiments, if the user is determined to be past a predefined distance from the electronic device, such as more than 5, 7, 10, 15, etc., feet from the electronic device, the user may be determined to have a low level of interaction or engagement with the electronic device. Additionally, by interacting with the electronic device including through a controlling device, a user may select a level of engagement or interaction that is then used by the electronic device. Once this determination has been made, the electronic device may perform one or more accommodations at step 450.

At least one accommodation may be performed with the electronic device based at least in part on the determined level of interaction for the one or more users or the location of the one or more users. The accommodations may be performed automatically or after a request has been presented to a user. The accommodations may include adjustments to a broadcast being displayed, audio characteristics or components, or video characteristics or components. As one example, the accommodation performed may include an automatic adjustment of the display property for displayed audiovisual content based on a predetermined preference of a controlling user. For example, 3-D displays utilizing a parallax barrier may be associated with the electronic device such that when a user has been located, the barrier may be adjusted automatically by the electronic device to optimize the display for that user location. Such a barrier may also be appropriately tuned for multiple viewers, or may adjust a first view based on the location of a first viewer, a second view based on the location of a second viewer, etc. for the number of viewers located. One such example may involve a split screen presentation, such as with a video game, for multiple viewers.

As previously described, if a particular user prefers the display to be adjusted in one or more ways to maximize display space of a coupled display device, this adjustment may be performed automatically when that particular user is located or identified by the electronic device. If the user has been determined to have a high level of interaction or engagement with the electronic device, the accommodation may include making available at least one interactive component of a broadcast being transmitted from the electronic device to the display device. For example, many broadcasts include additional content that can be displayed on an additional screen or as additional content with the broadcast, such as live updates by the show characters via Twitter® during a broadcast. If the user is determined to have a high level of interaction, the electronic device may continue to provide such additional content with which the user may interact. Additionally, based on an identity of a user, advertisements may be provided that have been selected based on demographics for the particular user. In embodiments the advertisements are chosen based on identity of a household, such as geographic information, and in embodiments the advertisements are selected based on specific user identity, such as by age, gender, race, etc. to provide targeted advertising to the interacting user.

A user may be determined to have a low level of interaction as well. For example, the user may move from the general area associated with the electronic device for numerous reasons including to take a phone call, to go to the bathroom, or to go to the kitchen for a snack, etc. Although the user may have previously been determined to have a high level of interaction, the electronic device may then change the determination of the user to have a low level of interaction with the device. In response, the electronic device may perform a number of accommodating actions. For example, the accommodation may include automatically transmitting an interactive message to the display device or to a controlling device requesting a response from the user. The request may include a variety of information including whether the user wishes to pause a broadcast, transfer broadcast from the display device communicatively coupled with the electronic device to an alternative display device, or whether the user wishes the electronic device and/or associated devices to be switched off. The electronic device may perform appropriate action if it does not receive a response after a predetermined amount of time. For example if no response is provided after a number of minutes, e.g. up to 5, 10, 15, 20, etc., the electronic device may automatically power down one or more associated devices including the electronic device itself.

A user may also respond indicating that he or she wishes to remain engaged with the broadcast, which may include a network broadcast, on-demand content, a movie display such as from a DVD, etc. For example, the user may elect to have the audiovisual content transferred to an alternate display, such as a tablet or an alternative display device located elsewhere. As would be understood, a variety of other accommodations may be performed that are encompassed by this technology.

Figure 5:
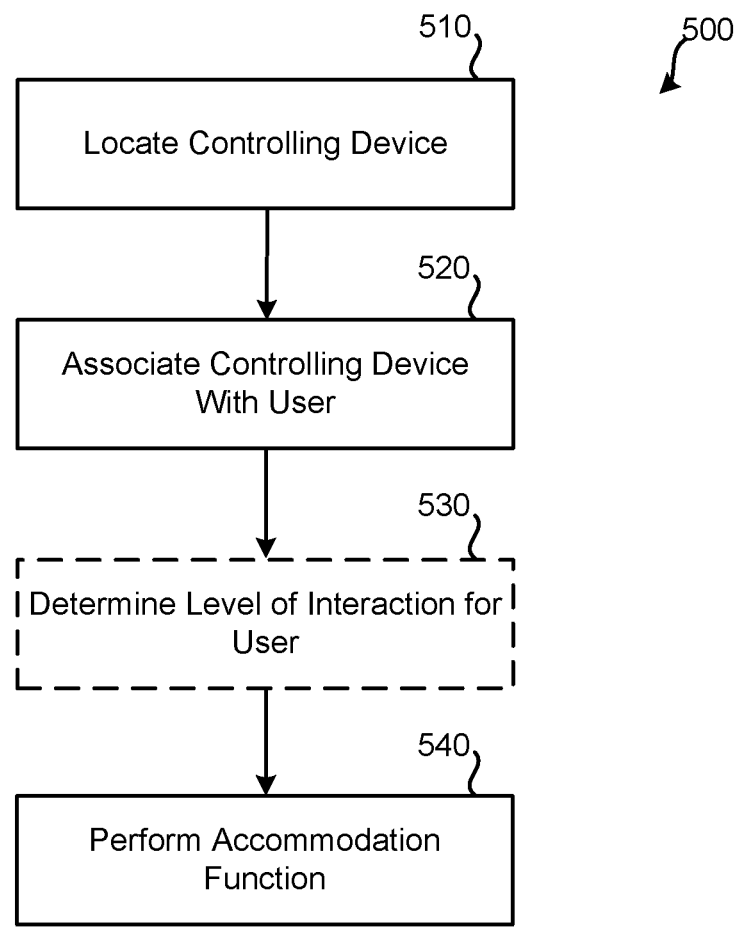
FIG. 5 shows another simplified flow diagram of a method for performing a user accommodation according to embodiments of the present technology.

FIG. 5 illustrates another embodiment of a method 500 for performing a user accommodation according to the present technology. Method 500 may be performed using any of the systems or components previously described. Method 500 may allow for a user to be located and/or identified such that accommodations can be enacted by an electronic device. Each step of method 500 may be performed by an electronic device, such as an STB, DVR, etc., or may be performed with more than one device in communication with one another. Means for performing each step of method 500 include a first electronic device and/or the various components of an electronic device or distribution system, such as those detailed in relation to FIGS. 1-3. Method 500 may represent a more detailed embodiment of method 400, or an alternative embodiment to method 400. Method 500 may be performed using a computerized device, such as a device incorporating some or all of the components of computer system 600 of FIG. 6.

At step 510, the electronic device may locate one or more controlling devices. Controlling devices may include any device previously described including a remote control, a mobile device, a videogame controller, a computing device, etc. In disclosed embodiments, the controlling device may include a clip, a lanyard, or some other mechanism by which the controller may be coupled with the user. The one or more controlling devices may be located based on information transmitted between the controlling devices and the electronic device. For example, the controlling devices may transmit continuous or intermittent updates to the electronic device that include location information.

The location information for the one or more controlling devices may be used to associate one or more of the controlling devices with one or more users at step 520. For example, a controlling device may be associated with the user based on presumed proximity of the user to the controlling device, and in disclosed embodiments may be based on predetermined identifiers for specific controlling devices. For example, identification information for mobile phones for each member of the family may be stored on the electronic device. These mobile phones may be configured to operate as controlling devices for the electronic device and thus when the electronic device determines a particular mobile phone is being utilized to operate the electronic device, the electronic device may be able to access stored data to determine a particular identity associated with the mobile phone. In disclosed embodiments, the electronic device may be or may not be associated with a videogame system having one or more videogame controllers. These controllers may be connected so as to identify a first player, a second player, etc. and the electronic device may be able to locate and associate particular users based on the location of the particular controllers. Method 500 may also optionally include determining a level of interaction for users at step 530 such as previously described.

The method 500 may also include performing an accommodation function at step 540. The accommodations may include one or more adjustments to devices associated with the electronic device as well as to audiovisual content being displayed. The accommodations may include any of the previously discussed accommodations, as well as further accommodations described here. For example, the user may have been determined to be located at a certain position, such as on a chair or couch, based on one or more of the location mechanisms previously discussed, e.g. based on a mobile phone associated with the user and acting as a controlling device for the electronic device. During a commercial break of a broadcast, or some other nondescript time, the user may move to another location bringing the controlling device with him. For example, a user may get up and move into an adjoining room such as a kitchen to prepare a snack.

The controlling device may update the electronic device on the changing condition, such as via intermittent signals transmitted while the controlling device is stationary and through continuous updates while the controlling device is moving. The electronic device may then perform accommodation functions such as by adjusting the sound through an associated sound system. The sound profile may be rebalanced by the electronic device as the user moves to maintain a quality sound profile. As one example, the electronic device may reconfigure the speakers such as to move the sounds presented through side speakers to be adjusted and presented through a front speaker, for example if the user has moved to a kitchen located in line with but further from a chair or couch in front of the electronic device. Alternatively, if a user has been determined to move to an alternative area, such as the kitchen or bathroom, the electronic device may stop or pause a program being played, for example, and may also change applications being utilized, such as play music including from a predetermined favorite station of the identified user. Additionally, if a user moves to a different location taking the controlling device with him, the controlling device may utilize alternative input mechanisms for control, such as voice. In disclosed embodiments, the system may also utilize one or more filters to discriminate against background noise or voices other than the user, for example.

As another example, many video games include multiple-player interaction and may utilize a split screen display to provide a perspective for each of the players. In disclosed embodiments, the electronic device may determine the location of each player interacting, and adjust the display accordingly. For example, in a two player scenario, if player one is seated on the left and player two is seated on the right, the electronic device may determine the location of each player and reconfigure a two-person display to have player one's view on the same side as where player one sitting. If the two players happened to switch position, based on the new position of the controllers, the electronic device may also switch the player's views accordingly.

In disclosed embodiments the electronic device may utilize both a scan function as well as location information for particular controlling devices in conjunction with one another. In this way, if the user happens to move away from a viewing location, but leave a controlling device at the location, the electronic device may still be able to determine that the user is no longer engaged with the electronic device. Accordingly, the electronic device may perform further accommodation functions, such as presenting a message on the display after a predetermined amount of time as described previously, where the message includes a request for response based on a determined inactivity, such as if the user has left the room. If the user does not respond within another predetermined amount of time, the electronic device may shut down itself along with various other associated components of an entertainment system. Such a message may also be presented at periodic intervals such as after 1, 2, 3, etc. hours to reduce power consumption if a user has fallen asleep or otherwise disengaged from the broadcast.

The electronic device may also coordinate speaker systems within furniture, such as furniture having internal subwoofers or other speakers. Based on the location of the user on such a piece of furniture, the electronic device may engage those particular speakers automatically, which may be performed based on a previously enacted communication path between the electronic device and the piece of furniture. In disclosed embodiments the electronic device may perform accommodation functions based on time of day. For example, after a certain time, e.g. 9:00 PM, the electronic device may automatically adjust the sound profile such as to reduce the overall sound levels emitted as well as to perform functions that may include turning off a subwoofer or other speakers.

In other embodiments, multiple electronic devices may coordinate with one another based on a user location. For example, a user may be watching the broadcast transmitted by or associated with a first electronic device. The user may then move to a second location in which a second electronic device is located. Based on environmental scanning or movement of the controlling device, the two electronic devices may determine that the user has moved from the first location to the second location. The electronic devices may then perform an accommodation that includes shutting down the first electronic device and any other devices associated with the first electronic device, turning on the second electronic device, such as switching on from a standby mode in which scanning may still be performed, turning on additional entertainment devices associated with the second electronic device, and continuing the display of the broadcast with which the user was previously engaged. Various other accommodations in line with the numerous examples described herein are also encompassed by the present technology as would be generally understood.

Figure 6:
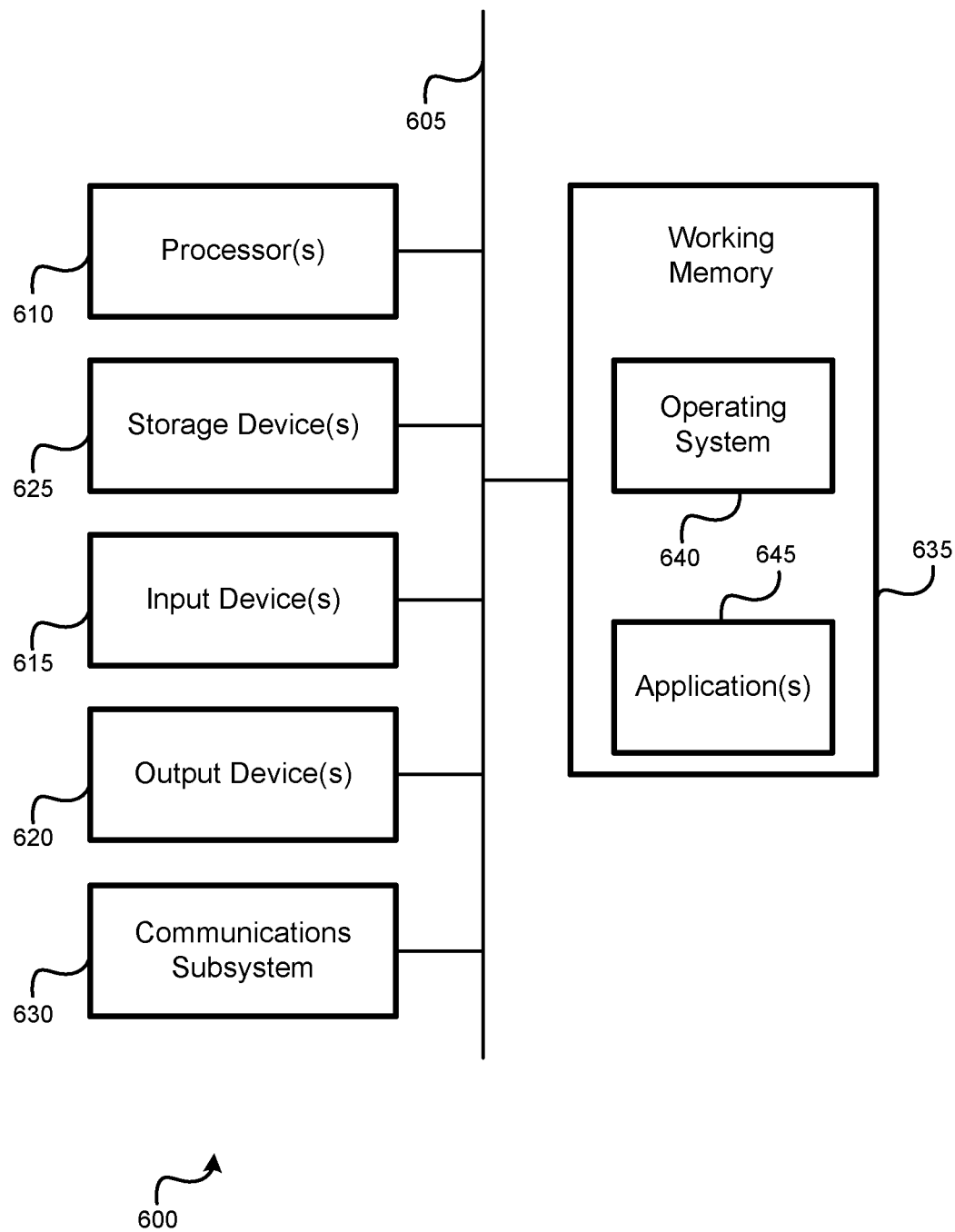
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as an STB, a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device or STB, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 4 and 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 825 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

Where a range of values is provided, it is understood that each intervening value, to the smallest fraction of the unit of the lower limit, unless the context clearly dictates otherwise, between the upper and lower limits of that range is also specifically disclosed. Each smaller range between any stated value or intervening value in a stated range and any other stated or intervening value in that stated range is encompassed. The upper and lower limits of those smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed:

1. An electronic device comprising:
   at least one audiovisual content input component;
   at least one output component communicatively coupled with at least one display device;
   one or more processors; and
   memory communicatively coupled with and readable by the one or more processors and having stored therein processor-readable instructions, which when executed by the one or more processors cause the one or more processors to:
   perform locating functions to locate one or more users of the electronic device, wherein at least one user of the one or more users is located based at least in part on an identified location of a controlling device, wherein the electronic device receives signal information to detect changing locations of the controlling device;
   based at least in part on the locating functions:
   detect a first location of the at least one user, and determine a first level of interaction for the at least one user;
   detect a second location of the at least one user, and determine that the at least one user has moved from the first location to the second location, where the first location is more proximate to a display device than the second location is;
   based at least in part on the second location, determine a second level of interaction for the at least one user, wherein the electronic device determines that the second level of interaction corresponds to a low level of interaction; and
   perform at least one accommodation function based at least in part on the low level of interaction for the at least one user, the at least one accommodation function comprising automatically transmitting an interactive message to the controlling device, the interactive message comprising a request for response based on inactivity determined by the electronic device.

2. The electronic device of claim 1, wherein the electronic device determines that the first level of interaction corresponds to a high level of interaction and the electronic device performs the at least one accommodation function based at least in part on a transition from the high level of interaction to the low level of interaction.

3. The electronic device of claim 2, wherein the at least one accommodation function comprises automatically transferring a broadcast from the display device to an alternative display device.

4. The electronic device of claim 2, wherein the interactive message comprises a request to transfer a broadcast from the display device communicatively coupled with the electronic device to an alternative display device.

5. The electronic device of claim 2, wherein the at least one accommodation function comprises adjusting a display format.

6. The electronic device of claim 1, wherein the one or more processors cause the electronic device to perform a scan to locate the one or more users.

7. The electronic device of claim 1, wherein the controlling device is communicatively coupled with the electronic device.

8. The electronic device of claim 1, wherein the accommodation function comprises automatically adjusting an audio component and a video component.

9. The electronic device of claim 1, wherein the one or more processors are further caused to identify the at least one user as a controlling user subsequent to locating the at least one user.

10. The electronic device of claim 9, wherein the at least one accommodation function comprises an automatic adjustment of a display property for audiovisual content based on a predetermined preference of the controlling user.

11. A method of accommodating a user of an electronic device, the method comprising:
    performing locating functions to locate one or more users of the electronic device, the performing locating functions comprising:
    locating at least one user of the one or more users based at least in part on an identified location of a controlling device, and
    receiving signal information and detecting changing locations of the controlling device based at least in part on the signal information;
    based at least in part on the locating functions:
    detecting a first location of the at least one user, and determining a first level of interaction for the at least one user;
    detecting a second location of the at least one user, and determine that the at least one user has moved from the first location to the second location, where the first location is more proximate to a display device than the second location is;
    based at least in part on the second location, determining a second level of interaction for the at least one user, wherein the electronic device determines that the second level of interaction corresponds to a low level of interaction; and
    performing at least one accommodation function based at least in part on the low level of interaction for the at least one user, the at least one accommodation function comprising automatically transmitting an interactive message to the controlling device, the interactive message comprising a request for response based on inactivity determined by the electronic device.

12. The method of claim 11, wherein the determining the first level of interaction for the at least one user comprises determining that the first level of interaction corresponds to a high level of interaction and the electronic device performs the at least one accommodation function based at least in part on a transition from the high level of interaction to the low level of interaction.

13. The method of claim 12, wherein the at least one accommodation function comprises automatically transferring a broadcast from the display device to an alternative display device.

14. The method of claim 12, wherein the interactive message comprises a request to transfer a broadcast from the display device communicatively coupled with the electronic device to an alternative display device.

15. The method of claim 12, wherein the at least one accommodation function comprises adjusting a display format.

16. The method of claim 11, further comprising causing the electronic device to perform a scan to locate the one or more users.

* * * * *